United States Patent [19]
Hashimoto

[11] Patent Number: 5,671,602
[45] Date of Patent: Sep. 30, 1997

[54] POWER GENERATING APPARATUS AND VACUUM GENERATING APPARATUS BY APPLYING TORRICELLI'S VACUUM

[75] Inventor: Kunio Hashimoto, Kitakyushu, Japan

[73] Assignee: Kabushiki Kaisha Nihon Pipe Conveyor Kenkyusho, Fukuoka-ken, Japan

[21] Appl. No.: 421,425

[22] Filed: Apr. 12, 1995

[30] Foreign Application Priority Data

Dec. 6, 1994 [JP] Japan ..................... 6-302441

[51] Int. Cl.[6] ........................................ F03G 3/00
[52] U.S. Cl. ................................................. 60/721
[58] Field of Search ..................................... 60/721

[56] References Cited

U.S. PATENT DOCUMENTS

| | | | |
|---|---|---|---|
| 4,070,855 | 1/1978 | Lund | 60/721 |
| 4,497,173 | 2/1985 | Gillian | 60/721 |
| 4,509,329 | 4/1985 | Breston | 60/721 |
| 4,852,350 | 8/1989 | Krisko | 60/721 |

*Primary Examiner*—Alfred Basichas
*Attorney, Agent, or Firm*—Poms, Smith, Lande & Rose

[57] ABSTRACT

By applying balance between atmospheric pressure and gravity, Torricelli's vacuum is formed and by utilizing the vacuum, power is generated. When the operating tube directs to nearly the right above, because of weight of the liquid in the inside of the operating tube, Torricelli's vacuum is formed under the piston, and by this vacuum, the piston is lowered to rotate the operating crank shaft. Then, linking to the rotation of the operating crank shaft, the operating tube inclines, then the piston is pushedly returned to the original position by the liquid, and in this state the operating tube is returned to the afore-described position. A plurality of operating tubes which are balanced in gravity by the balance weighing mechanism repeat the afore-described operation in different phases.

7 Claims, 10 Drawing Sheets

POWER GENERATING APPARATUS AND VACUUM GENERATING APPARATUS BY APPLYING TORRICELLI'S VACUUM

BACKGROUND OF THE INVENTION

1. Field of the Invention

The present invention relates to power generating apparatus and vacuum generating apparatus by applying Torricelli's vacuum.

2. Description of the Prior Art

Prior energy sources include hydraulic power, thermal power, atomic power, etc.

Energy-generating sources such as hydroelectric power generating means, wave-applying electric power generating means, etc., require highly expensive installation costs and locations which must satisfy various restricted conditions. Fossilized fuels such as petroleum or the like which are utilized to generate thermal energy by combustion are not inexhaustible, and there are also problems of environmental pollution caused by exhaust gases. Further, energy generating installations utilizing atomic power are in general too expensive and also have public hazard problems resulting from radioactivity.

SUMMARY OF THE INVENTION

In view of the above-described problems of the prior art, it is an object of the present invention to provide power generating apparatus for generating actuating power by utilizing Torricelli's vacuum which applies clean and inexhaustible atmospheric pressure, and vacuum generating apparatus which can produce vacuum with quite small energy. The above-described problems of the prior art can be solved by the present invention as follows.

The power generating apparatus applying Torricelli's vacuum is characterized to include a plurality of operating tubes each pivotally supported by a horizontal axis provided at an intermediate portion of a frame, so that each of the operating tubes can freely make rising-up and falling-down movements. The power generating apparatus also includes a crankshaft having a plurality of crank parts. Each of the operating tubes is provided with a piston at the upper or longer end thereof. The piston slidably and hermetically fits into each of the tubes, and inside each of the tubes is accommodated a liquid, so that under the piston on the inside of the operating tube, Torricelli's vacuum may be formed. When the operating tube comes to a position directed substantially to the right above, and when each of the pistons is connected with the respective crank parts of the crankshaft coupled with driven means, and accompanying with rotation of the crankshaft, the operating tubes are driven to make rising-up and falling-down movements in mutually different phases. All of the operating tubes and the liquids on the insides of the operating tubes are mutually related so as to be able to balance in gravity at both sides of the pivotal axis of the operating tubes by making the pivotal axis as a border thereof.

The power generating apparatus applying Torricelli's vacuum according to the present invention include a plurality of operating tubes, each of which is folded upwardly at both ends, nearly with a right angle to the intermediate portion of the tube, and has on the inside thereof a liquid. Each of the operating tubes is pivotally movable about an axis on the intermediate portion of each of the operating tubes so as to be able to pivot within a range from a position where both ends are directed to a slightly upwardly inclined to a position at which both ends are directed nearly right overhead. A plurality of pistons are provided each of which is slidably fit into the inside of the longer end, that is, the upper end of the folded ends of the respective operating tubes in the longitudinal direction thereof, so as to keep a hermetical state therein. A plurality of the piston rods are provided, each of which is connected at one end thereof with each of the pistons. Each of the piston rods penetrates upwardly the longer end of the operating tube, and extends along with the end in parallel. A pressing down roller is pivotally secured to the other end of each piston rod. An operating crankshaft is provided rotatably on the upper portion of the frame. The operating crankshaft has a plurality of crank parts which are disposed to have a same angle difference with each other. A plurality of suspending members are respectively suspended from each of the crank parts of the crankshaft to rotate the crankshaft. At the lower end portion of each suspending member is provided with a horizontal piece with which the pressing roller of the piston can be engaged. The horizontal piece is pressedly lowered by the pressing roller to urge the operating crankshaft to rotate. A rising-up and falling-down crankshaft is linked with the operating crankshaft so as to rotate simultaneously therewith. The rising-up and falling-down crankshaft has a plurality of crank parts each of which has a same angle difference from each other. A plurality of connecting rods each connects and eccentric portion of each of the operating tube to each of the crank parts of the rising-up and falling down crankshaft so that, accompanying the rotation of the rising-up and falling-down crankshaft, all of the operating tubes may begin the rising-up and falling-down movements in mutually different phases, and all of the operating tubes and the liquid accommodating or filling the operating tubes can be always balanced in gravity at the pivotal axis. Stopper means for preventing each of the piston rods from being lowered are provided. The stopper means function when the longer end of each of the operating tubes is inclined to disengage the pressing down roller from the horizontal piece of the suspending member, and in case the piston is pushed up by the raising level of the liquid on the inside of the longer end of the inclined operating tube. A plurality of releasing means is provided, each of which for releasing a stopped condition of each of the operating tubes, when the longer or upper end of each of the inclined operating tubes is directed nearly right above or overhead. The length of each of the longer ends of each of the operating tubes is determined to such a length as to form Torricelli's vacuum on the inside of the operating tube when it comes to a position at which it is directed nearly right above or overhead.

In accordance with the invention, either the operating crankshaft or the rising-up and falling-down crankshaft may coupled with the driven means as an output shaft. In addition, the auxiliary power means may be connected to either the operating crankshaft or the rising-up and falling-down crankshaft.

The power generating apparatus according to the present invention may be further characterized as follows. A plurality of balance weights may be mounted on the pivotal axis of the operating tubes or in the vicinity thereof so that the center of gravity thereof may always act with respect to the pivotal axis in a direction opposite to a direction toward which the center of gravity of each of the operating tubes shifts in response to the rising-up and falling-down movement of each of the operating tubes. Balance weighing means balance a change in gravity caused by a shifting in position of the center of gravity by removal of the liquid and changing position of the balance weight. The balance weights, the operating tubes, and the liquids therein in totality are always kept in balance in gravity at the pivotal axis.

In accordance with the present invention, the power generating apparatus according to the present invention is further characterized in that a plurality of bypass tubes each is provided with an electromagnetic valve at a portion of the longer or upper end of each of the operating tubes, at which portion a level of the liquid on the inside of the tubes reaches, when each of the operating tubes inclines at a maximum.

The present invention is further characterized in that between each of the pistons and each of the operating tubes into which the piston is slidably fit, a flexible diaphragm capable of being expanded and contracted in response to the sliding movement of the piston and being adapted to seal hermetically between the piston and the operating tube is provided.

In accordance with the present invention, the entire apparatus, except an operating part and an output part may be accommodated in the pressure chamber.

Vacuum generating apparatus according to the present invention is characterized to include a plurality of operating tubes each of which is folded upwardly at both ends nearly with right angle to an intermediate portion of the tube. One end of each tube is closed by an upper wall, and the other end thereof is opened. The inside of the tube is filled with a liquid. The intermediate portion of each of the operating tubes is pivotally supported by a nearly horizontal axis so that each of the operating tubes may be pivotally moved about the horizontal axis within a range from where both ends are directed from a slightly upwardly inclined position to a nearly right above or overhead position. A rising-up and falling-down crankshaft has a plurality of crank parts each of which is remote at a same angle difference from each other. A plurality of connecting rods are provided, each of which connects an eccentric portion of each of the operating tubes to each of the crank parts of the rising-up and falling-down crankshaft so that, accompanying the rotation of the rising-up and falling-down crankshaft, all of the operating tubes may begin rising-up and falling-down movements in different phases with one another, and all of the operating tubes and the liquids accommodated on the insides of the operating tubes may be always balanced in gravity at the pivotal horizontal axis. Driving means are provided for rotating the rising-up and falling-down crankshaft. A plurality of flexible tubes are provided, each of which communicates each of the closed ends of the operating tubes with a pressure reducing tank. A plurality of electromagnetic valves are respectively provided at one end of each of the flexible tubes which is near to each of the operating tubes. Each of the electromagnetic valves is able to switch a closing position of each of the operating tubes to a position at which each of the operating tubes communicates with each of the flexible tubes and to a position at which each of the operating tubes communicates with atmosphere. The length of each of the closed ends of each of the operating tubes id determined to such a length as to form Torricelli's vacuum under the closing upper wall by the liquid in the inside of each of the operating tubes, when the end reaches a position directed nearly right above.

The vacuum generating apparatus according to the present invention is further characterized in that a plurality of balance weights provided, each of which is mounted on the pivotal axis of each of the operating tubes or in the vicinity thereof so that the center of gravity thereof may always act with respect to the pivotal axis in the opposite direction, to a direction to which the center of gravity of each of the operating tubes shifts in conjunction with rising-up and falling-down movement of each of the operating tubes. A plurality of balance weighing means are provided, each of which balances change in gravity caused by shifting of position of the center of gravity according to the removal of the liquid and changing position of each of the balance weights are provided. All the balance weights, all the operating tubes, and all liquids therein are always kept the balance in gravity at the pivotal axis.

The power generating apparatus and the vacuum generating apparatus applying Torricelli's vacuum according to the present invention operate as follows. When one of the operating tubes reaches a position at which the ends thereof are directed nearly overhead, by means of gravity of the liquid on the inside of the operating tube, Torricelli's vacuum is formed under the piston. Because of the vacuum, the piston is lowered to rotate the crankshaft, and, in conjunction with the rotation of the crankshaft, each of the operating tubes inclines. The piston is then pushedly returned back by the liquid to the original position. Further, the operating tube is in its same state returned to the original position. The plurality of the operating tubes repeat the afore-described operation in mutually different phases, so that the crankshaft rotates continuously. All the operating tubes and the liquids on the insides thereof are always lanced in gravity at the pivotal axis of the operating tubes; therefore, only a small amount of energy is consumed to make each of the operating tubes under go reciprocal pivotal movements. Almost the entire force to lower the piston generated by Torricelli's vacuum can be applied to rotate the crankshaft, so that the crankshaft can be rotated continuously with high efficiency.

DETAILED DESCRIPTION OF THE PREFERRED EMBODIMENT

Figure 1:
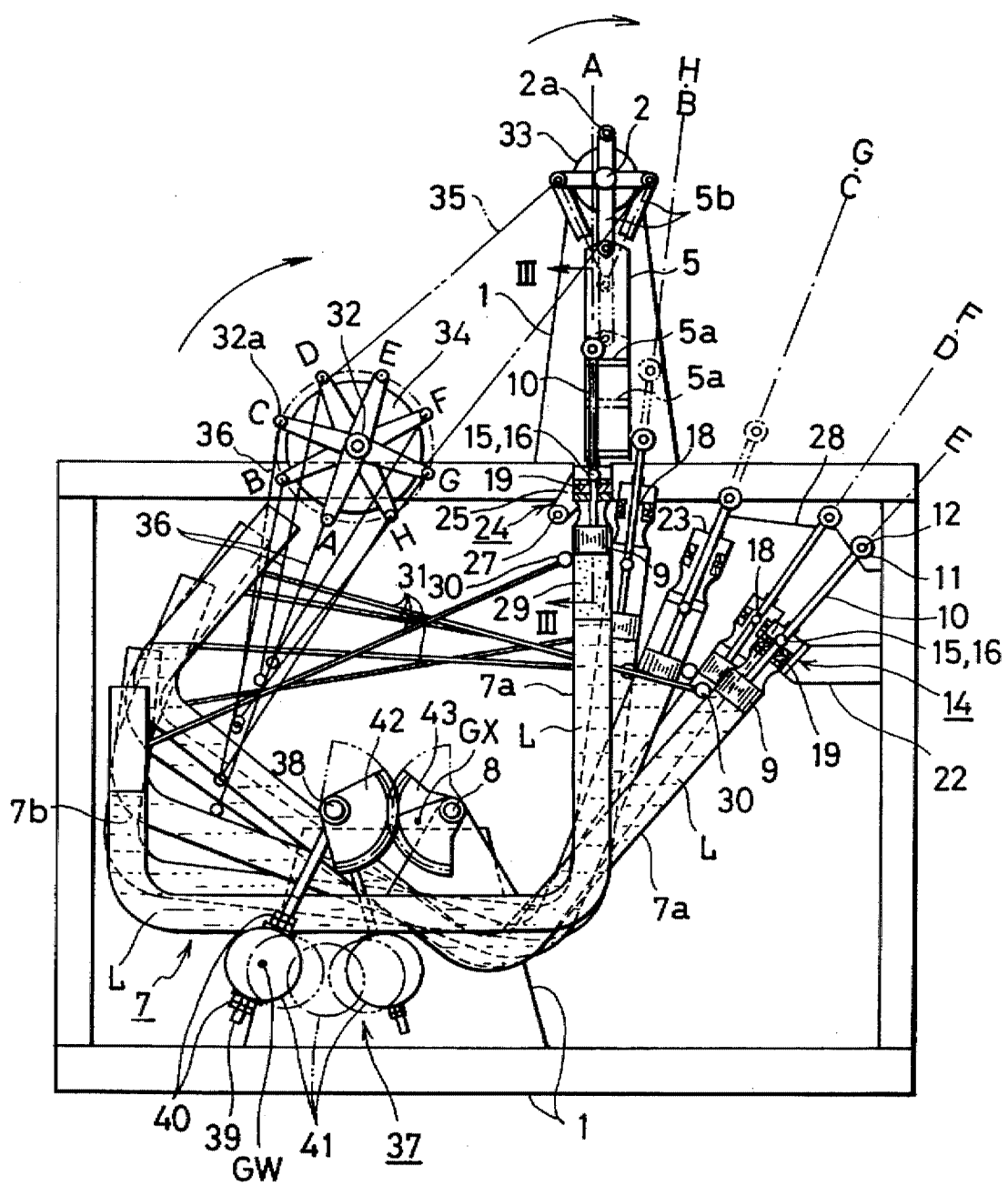
FIG. 1 is an elevational view of the first embodiment of power generating apparatus according to the present invention.

Referring to FIGS. 1 to 8, the first embodiment of the present invention (the embodiment of the invention claimed in claims 1 to 7) is explained.

In FIGS. 1 to 4, reference number 1 designates a rectangular frame. A crankshaft 2 is rotatably pivoted on the rectangular frame 1 and connected to a driven device (not shown) through a chain sprocket 3 and a chain 4 so as to move in forward and backward directions; that is, in the present embodiment, the operating crankshaft 2 is used as an output shaft.

The operating crankshaft 2 has a plurality of crank parts 2a with an appropriate interval between each of adjacent one in the forward and backward directions. Each of the crank parts 2a is disposed at respective positions having an angular difference of 90 degrees with each of adjacent one. In this embodiment, two sets of crank parts 2a, with each set including four crank parts, i.e., for a total of eight crank parts 2a are provided.

On the lower end of each crank part 2a is provided a laterally directed horizontal piece 5a. An upper end of a suspending member 5, which can ascend and descent along a guide member 6 secured to the frame 1, is connected to the lower end of each crank part 2a through link 5b.

On the lower portion of each of the crank parts 2a of the operating crankshaft 2 is provided an operating tube 7, both ends of which are upwardly bent and inside of which is provided a liquid L, for example, such as mercury, water, oil, fluidized metals or relatively weighty liquids (including high viscosity liquids, gel formation liquids, etc.). Each operating tube 7 is pivotally supported by the frame 1 by a horizontal pivotal shaft 8 with the intermediate of which directed in the forward and backward directions so that the right end portion 7a of the operating tube 7 can rotate within the range of a position at which the right end portion 7a is nearly right above to that of it 'being at an obliquely upwardly directed position, as shown in FIG. 1.

Figure 3:
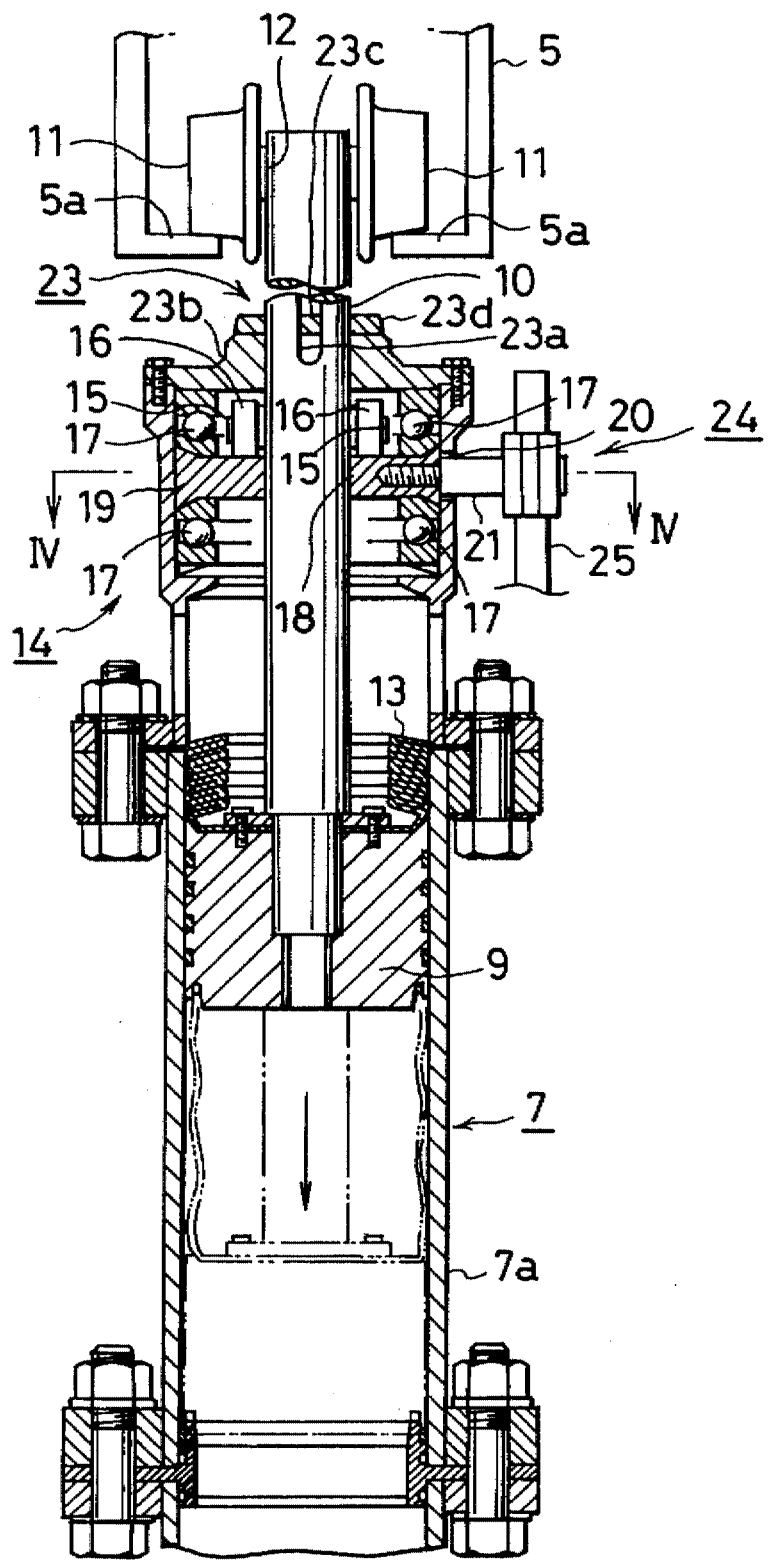
FIG. 3 is an enlarged sectioned view cut along line III—III shown in FIG. 1.
Figure 4:
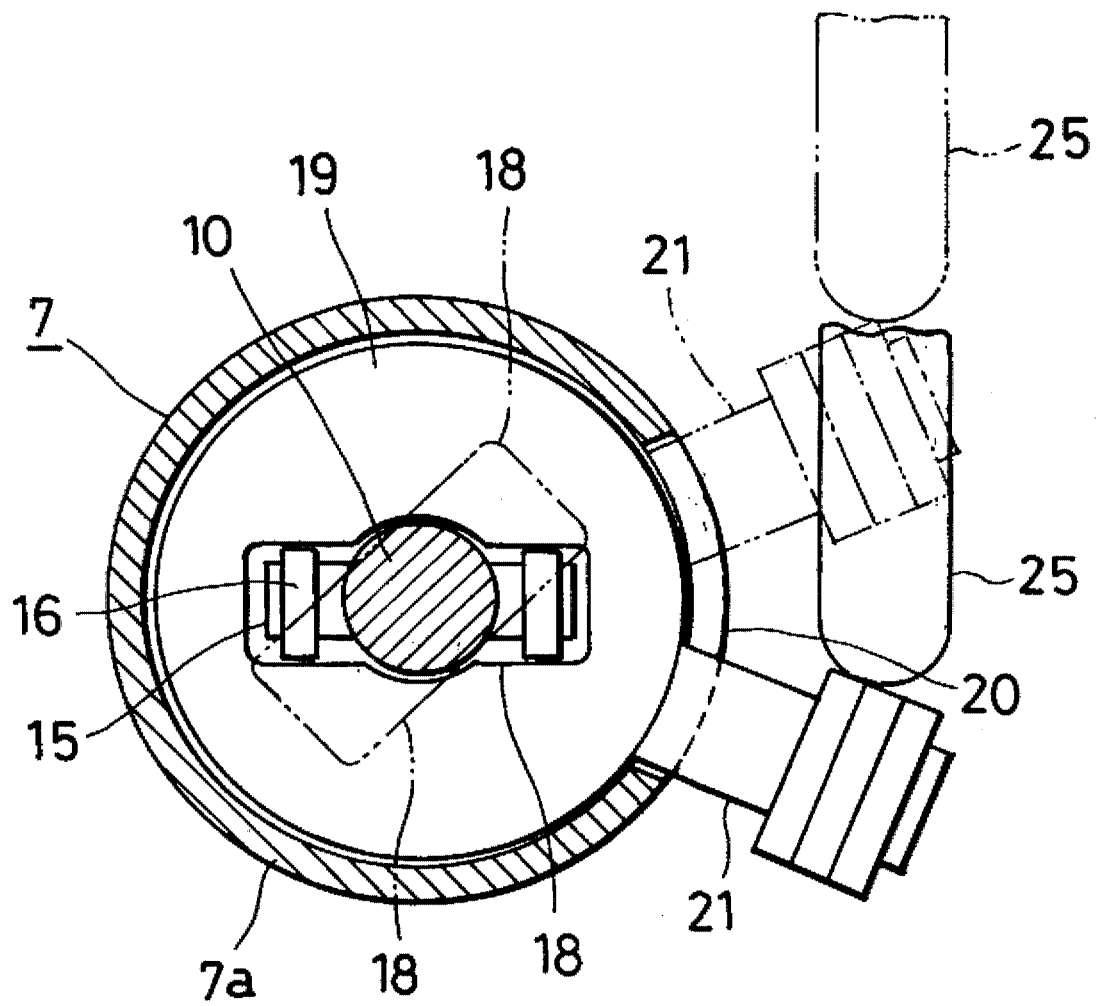
FIG. 4 is a sectioned view cut along line IV—IV shown in FIG. 3.

As particularly shown in FIG. 3, inside of the right end portion 7a of each of the operating tubes 7 is provided a piston 9 which can move slidably in the inside of the right end portion 7a in a longitudinal direction and which keeps the inside in a sealed condition.

Reference number 10 designates a piston rod which penetrates the upper end of the upward-directed right end portion 7a of each of the operating tubes 7 and extends in parallel with the right end portion 7a. The lower end thereof is connected with the piston 9 and the upper end thereof is connected with a pressing down roller 11 which descends in contact with the upper surface of the horizontal piece 5a of the suspending member 5 and which rotates the operating crankshaft 2 by pressing down on the suspending member 5. The pressing down roller 11 is pivotally secured to a horizontal shaft 12.

In FIG. 3 reference number 13 indicates a flexible bellows-like tubular diaphragm. One end of the tubular diaphragm 13 is attached to an appropriate position of the upper portion of the right end part 7a of the operating tube 7 and the other end is thereof secured to the piston 9. Accordingly, the bellows-like tubular diaphragm 13 performs expansion and contraction in response to sliding movements of the piston 9 in the inside of the operating tube 7 and keeps a space produced between the piston 9 and the operating tube 7 in an air-tight condition. This diaphragm 13 may be omitted according to the preferred embodiment.

Reference number 14 indicates a stopper which interrupts the lowering of the piston rod 10 when the pressing down roller 11 of the piston rod 10 is separated from the horizontal piece 5a of the suspending member 5 toward the right side according to the inclination of the right end portion 7a of each of the operating tubes 7, by which the level of the liquid in the inside of the right end portion 7a of each of the operating tubes 7 has risen to push up the piston 9 caused by the inclination of the operating tube 7.

The stopper 14 includes a pair of rollers 16 which are pivotally fitted nearly in the intermediate portion of each of the piston rods 10 with a pair of pins 15 laterally provided to each of the piston rods 10. A rotary plate 19 is fitted in the upper part of the right end portion 7a of each of the operating tubes 7 by a pair of upper and lower thrust bearings 17 so that the rotary plate 19 can angularly rotate to any desired angle but cannot move in the longitudinal direction of the right end portion 7a of the operating tube 7. The rotary plate 19 has a penetrating hole 18 in the central part thereof through which the pins 15 and the rollers 16 can pass only when the stopper means 14 stops at a releasing position as shown by a solid line in FIG. 4. An operating piece 22 (refer to FIG. 1) projects from the side of the rotary plate 19 when the right end portion 7a of the operating tube 7 is inclined at the maximum. The operating piece 22 contacts a shaft 21 projecting laterally through an arched long hole 20 bored in the side of each of the operating tubes 7 (refer to FIG. 4) to rotate the rotary plate 19 to a position at which the pins 15 and the rollers 16 are prevented from passing, as shown by phantom line in FIG. 4. The operating piece 22 is secured to the frame 1.

Reference number 23 indicates a stroke regulating means for regulating the ascending and descending strokes of the piston rod 10 to the operating tube 7, for example, as described hereinafter, to regulae the stroke to 300 min. The stroke regulating means 13 includes a long groove 23a provided on the outer surface of the piston rod 10, so as to direct in the axial direction, and having predetermined length. A stopping plate 23d is secured to a blocking plate 23b for blocking the upper end of the right end portion 7a of the operating tube 7, and has an inwardly projecting piece 23c which engages with the long groove 23a. The stroke regulating means 23 further serves as a rotation stopping means of the piston rod 10.

Reference number 24 indicates a releasing means 24 which releases a locked condition of the piston rod 10 when the right end portion 7a of the operating tube 7 comes to a state directly right overhead. The releasing means 24 has an operating piece 25 which rotates the rotary plate 19 to the releasing position, that is, to the unlocked position of the piston rod 10, by contacting with the shaft 21 when the right end portion 7a of each of the operating tubes 7 is directed nearly right overhead. The operating piece 25 is secured to a stopper shaft 27 which can be rotated with a handled 26 of the stopper means 14. This releasing means 24 begins to operate at a time when the crank part 2a of the operating crankshaft 2 slightly rotates to the right from the top dead center.

In FIG. 1, reference number 28 is a guiding piece which guides shifting movement of the pressing down roller 11 when the pressing down roller 11 of the piston rod 10 is separated from the horizontal piece 5a of the suspending member 5 toward the right side according to inclination of the right end portion 7a of each of the operating tubes 7, and when the piston 9 is pressed up in response to a rising of the level of the liquid in the inside of the right end portion 7a of the operating tube 7 caused by the inclination.

The right end portion 7a is longer than the left end portion 7b so that Torricelli's vacuum (the vacuum part is shown with the reference number 29 can be forced at the lower part of the piston 9 by the liquid L in the operating tube 7, when the right end portion 7a is directed to the right overhead.

When the right end portion 7a of the operating tube 7 is inclined at the utmost limit, a part at which the surface of the liquid L in the right end portion 7a reaches and the upper part of the left end portion 7b of the operating tube 7 are mutually communicated with a bypass tube (an air exhausting tube) 31. An electromagnetic valve 30 is provided in the bypass tube 31 near the right end portion 7a of the operating tube 7.

A rising-up and falling-down type crankshaft 32 is pivotally supported at the side of the operating crankshaft 2 by the frame 1 in parallel with the operating crankshaft 2. The crankshaft 32 and operating crankshaft 2 are interconnected by two chain sprockets 33, 34 having different diameters and a chain 35 engaged with the sprockets 33, 34. The two chain sprockets 33, 34 and the chain 35 are configured such that the operating crank 2 and the rising-up and falling-down crankshaft 32 rotate simultaneously, with the former rotating two rotations and the latter rotating one rotation.

The rising-up and falling-down crankshaft 32 is provided with a plurality of crank portions 32a (in the present embodiment, eight crank portions). Each crank portion 32a is disposed at an even or identical interval in the front and rear direction as that of each of the operating tubes 7 and shifted within angle of 45 degrees from each adjacent one.

Each of the crank portions 32a of the rising-up and falling-down crankshaft 32 is connected to an eccentric point on each of the operating tubes 7, each of which in turn deviates from the pivot 8 by each of the connecting rods 36 having the identical length, so that each of the operating tubes 7 can perform the rising-up and falling-down movement in order according to the rotation of the rising-up and falling-down crankshaft.

In accordance with the rising-up and falling-down movement of the operating tubes 7, the liquid L begins to flow in the inside thereof; therefore, as shown in FIG. 1 (and FIG. 8), the center of gravity Gx of each of the operating tubes 7 and the liquid therein gradually varies in response to inclining states A–H of the operating tubes 7. Accordingly, this center of gravity Gx cannot always coincide with the pivot 8. In view of the foregoing in the embodiment of the present invention, the pivot 8 is set at an appropriate position within the range which the center of gravity Gx may shift (in the present embodiment, the position is set to the right end. When the pivot 8 is apart from the center of gravity Gx, the unbalance of gravity generated by the variation can be counterbalanced by balance weighing means 37.

The balance weighing means 37 includes a supporting rod 39 pivotally secured to the frame 1 at the side of the pivot 8 at an upper end thereof by an axis parallel to the pivot 8, and a balance wight 41 adjustably attached in height to the supporting rod 39 by a pair of upper and lower locking nuts 40 which are screwed to a lower part of the supporting rod 39. To the upper end of the supporting rod 39 is secured a sector gear 42 which expands as a sectorial shape by centering an axis 38. This sector gear 42 engages with a sector gear 43 which rotates together with each of the operating tubes 7 about the pivot 8. Accordingly, the balance weight 41 moves in conjunction with the rising-up and falling-down movement of each of the operating tubes 7 so that, with reference to the pivot 8, the center of gravity Gw of the balance weight 41 may rotate in the opposite direction to that of the center of gravity Gx of the operating tube 7.

The ratio of the number of teeth of the sector gears 42 and 43 in the balance weighing means 37 (in this embodiment, for the sake of simplification, the ratio is 1:1), the weight of the balance weight 41, and a distance from the axis 38 to the center of weight of the balance weight 41 can be appropriately adjusted and modified, so that gravitational unbalance caused by changed of the position of the center of gravity occurred about the pivot 8 by the inclining movement of one single operating tube 7 can be reduced nearly to zero.

The balance weights 41, the operating tubes 7 and the whole liquid L in the operating tubes 7 in totality are always substantially in equilibrium by setting the pivot 8 of the operating tubes 7 as a borderline. In the present embodiment, as described above, since the balance weight device 37 is provided, the balance wight 41 and each of the operating tubes 7 and the liquid L therein are always balanced in gravity and by establishing the piston 8 of the borderline. However, by fining any point at which all of the operating tubes 7 and the liquid L therein are always balanced, in gravity and by disposing the pivot 8 at the point, the aforedescribed balance weighing means 37 can be removed.

Further, in the case of being impossible to find any point described the above, it is possible to balance the gravity, for example, by disposing apparatus shown in FIG. 1 from which the balance weight device 37 is removed and apparatus which is symmetrical with the apparatus one after another, and by connecting mutually each of the rising-up and falling-down crankshafts 32 or each of the operating crankshafts 2.

In this case for the purpose of applying the falling force of the piston 9 caused by Torricelli's vacuum as a rotation driving force always acting in the same direction, in any of the either apparatus when the crank part 2a of the operating crankshaft 2 rotates slightly toward the right of the top dead center, the releasing means 24 is made to operate accordingly.

The reference number 45 indicates a manually operating handle connected to the outer end portion of the operating crankshaft 2, and reference number 46 indicates an operating handle connected to the outer end portion of the rising-up and falling-down crankshaft 32. In reference to FIGS. 5 to 8, an operational principle of the present embodiment will be explained in detail with the operation of the embodiment being provided thereafter.

Figure 5:
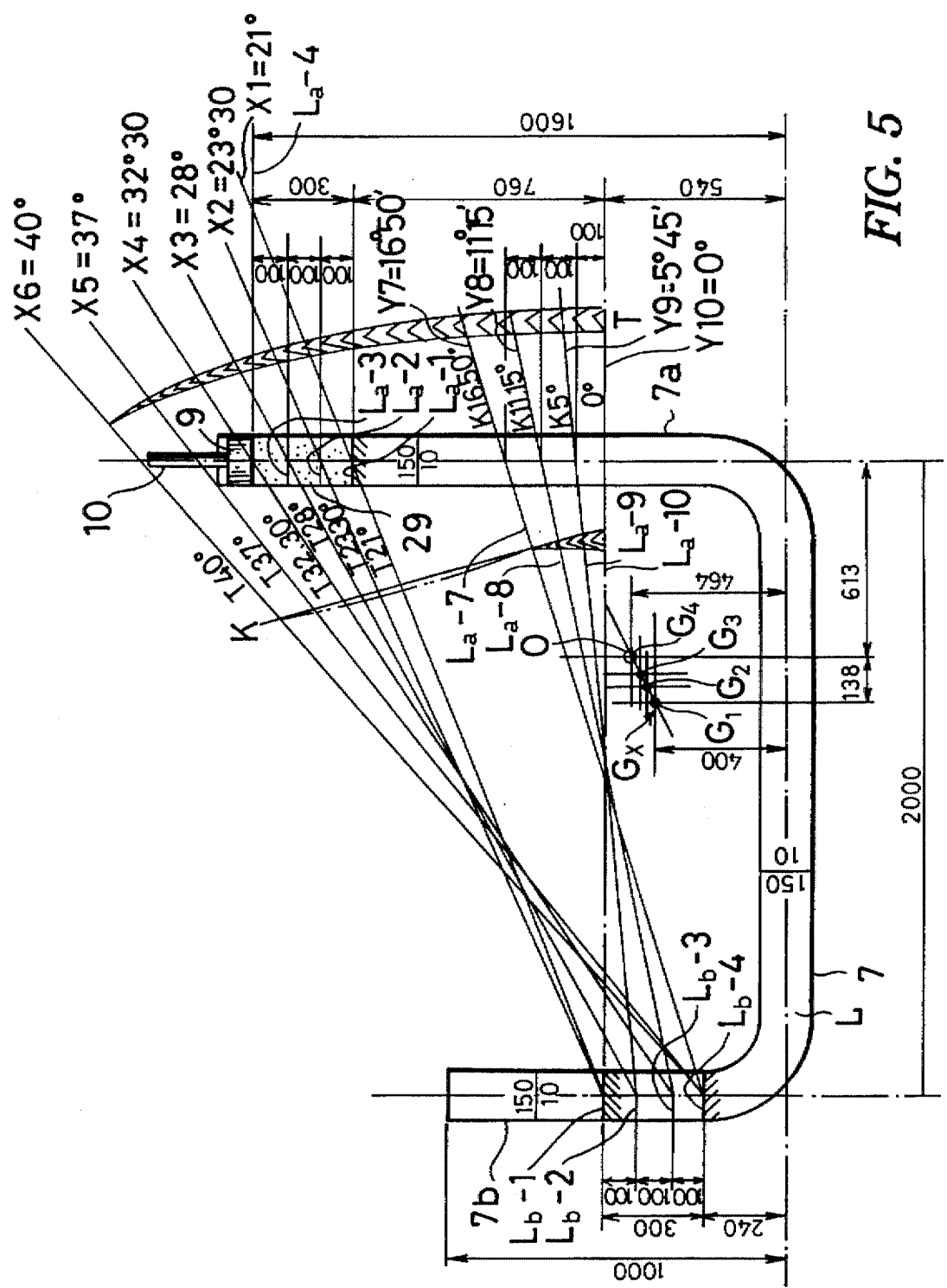
FIG. 5 is an elevation view showing one single operating tube of the first embodiment, and also showing the surface of a liquid and a position of gravity on the horizontal line.

In FIG. 5, there is shown a single operating tube 7 in which a right end portion 7a thereof is directed nearly right overhead. A state at which the stopper 14 of the piston 9 has been still unreleased is shown by a solid line. At a place lower than 300 mm from the lower surface of the piston 9 at the above-described time, that is, in the unreleased state, the level of the right side La-1 of the liquid L (e.g., mercury) is located, and therebetween the Torricelli's vacuum 29 is defined. The liquid level Lb-1 of the liquid L on the inside of the left end portion 7b of the operating tube 7 is situated at a place 760 mm lower than that of the liquid level La-1 of the right end portion 7a of the operating tube 7. G1 is the center of gravity of the operating tube 7 and the liquid L on the inside thereof. In this case, the weight of the piston 9 is not taken into the consideration. O is the center of rotation of the pivot 8, i.e., the rotational center of the operating tube 7.

Each liquid level La-2, La-3 and La-4 indicates respective liquid levels of the right end portions of the operating tube 7 when each ascends by 100 mm, 200 mm and 300 mm, respectively, higher than the liquid level of La-1, and each liquid level Lb-2, Lb-3 and Lb-4 indicates respective liquid levels of the left end portions of each of these states. Each of the aforementioned liquid levels Lb-2, Lb-3 and Lb-4 is lower by 100 mm, 200 mm and 300 mm than the liquid level Lb-1, respectively. Each line X1 to X6 is a line obtained by projecting lines from the horizontal when the operating tube 7 is inclined to an angle indicated after the equals sign (for example, X3=28 degrees from the horizontal). Lines Y7 to Y10 are obtained the same as lines X1 to X6, i.e., each is a projected line which is obtained by projecting respective lines from the horizontal when the operating tube 7 is raised to an angle indicated after the equals sign. Each line X1 to X6 and Y7 to Y10 corresponds to respective inclination angles θ1 to θ10 of the right end portion 7a of the operating tube 7. These angles and each position or level of liquid L, which is to be described hereinafter, are values which are determined in a specified embodiment.

Line X1 is a line connecting the center of liquid level La-1 of the right side with that of liquid level Lb-1 of the left side. Line X2 is a line connecting the center of liquid level La-2 of the right side with the center of liquid level Lb-1 of the left side (the reason why it is not liquid level Lb-2 will be understood from the following explanation).

As described above, each line X3, X4 is a line connecting each of the centers of liquid levels La-3, La-4 of the right side to each of the centers of liquid levels Lb-2, Lb-3 of the left side respectively. Lines X5, X6 are lines having angles of elevation of 37° and 40° with respect to the horizontal line (parallel to line Y10=0) of FIG. 5 from the center of liquid level Lb-4 of the left side, respectively.

Each line Y7, Y8, Y9 and Y10 is a respective line which connects each of the centers of imaginary liquid levels La-7, La-8, La-9 and La-10, which are levels respectively lower by 760 mm, 860 mm, 960 mm and 1060 mm than the center of liquid level La-4 of the right side with each of the centers of liquid levels Lb-4, Lb-3, Lb-2, and Lb-1 of the left side.

Figure 6:
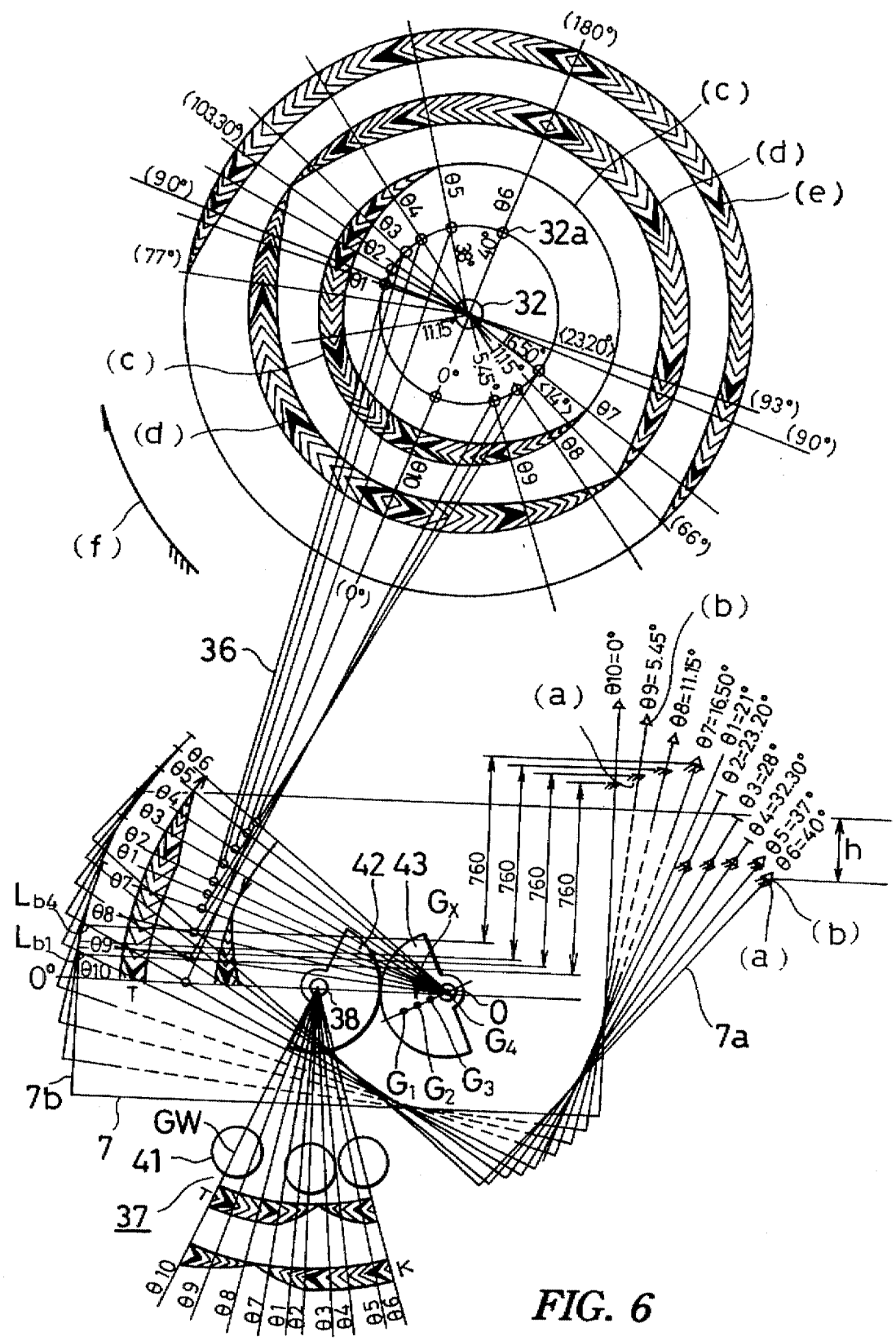
FIG. 6 is a diagram illustrating principles of operation, particularly relations among gravity unbalance caused by change in position of the center of gravity, gravity unbalance of a balance weight and resultant force of them.
Figure 7:
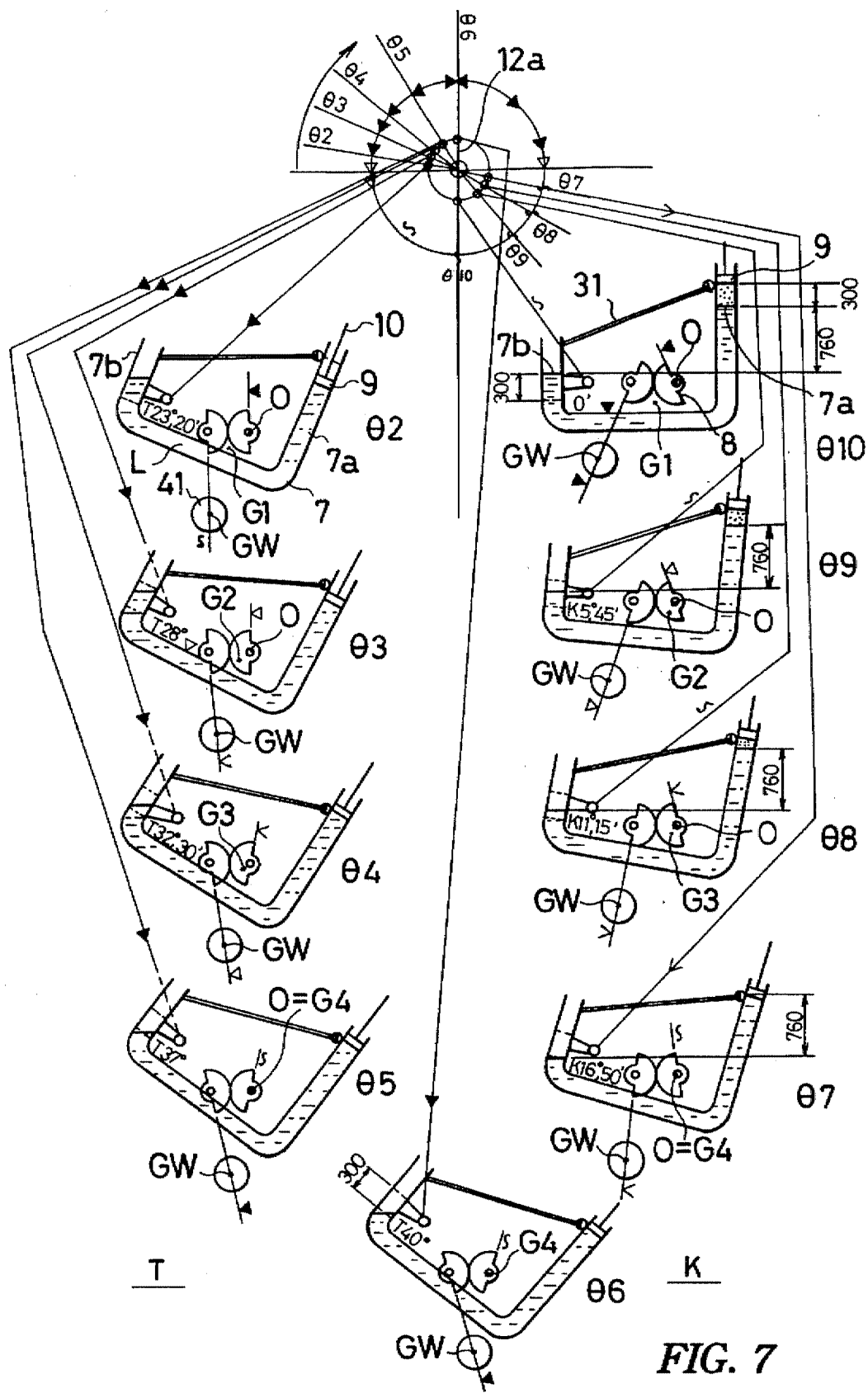
FIG. 7 is a diagram illustrating diagrammatically each state of the operating tube standing in each of a plurality of inclining positions.

With reference to FIGS. 5 and 6, a change of the liquid level of the liquid L in response to the inclination movement of a single operating tube 7 in the embodiment, and a change of the center of gravity Gx of the operating tube 7 and the liquid L are explained hereinafter. In FIGS. 5 and 7 there are describe angles headed by T and also angles headed by K. Each of the former indicates an angle when the operating tube 7 falls down, and each of the latter represent an angle when the operating tube 7 rises up.

A state of the operating tube 7 directly before reaching an inclination angle of θ10=0°. which is drawn in FIG. 6 and shown by a solid line in FIG. 5, and the position of the center of gravity Gx at that time is G1. From this state, the operating tube 7 comes to inclination angle θ10=0°, and the stopper 14 is released by the releasing means 24. Then, by means of suctioning force of Torricelli's vacuum 29, the piston 9 descends 300 mm with a stroke regulated by the stroke regulating means 23, and the lower surface of the piston reaches to liquid level La-1. By means of the descending movement of the piston 9 at that time, a large rotational force as described hereinafter is given to the operating crankshaft 2.

After the lower surface of the piston 9 has reached liquid level La-1, until the operating tube 7 reaches inclination angle θ1=21°, the piston 9 is regulated by the stroke regulating means 23 to not descent any further, so that the position of the operating tube 7 and liquid levels La-1, Lb-2 of the liquid L do not change. Further, the position of the operating tube 7 and the center of gravity G1 of the liquid L do not change.

When the operating tube 7 changes from inclination angle θ1=21° to θ2=23° 30', the liquid level of the liquid L pushes the piston 9 upward in response to the liquid level rising up to line X2=23° 30'. However, by means of friction and so on between the piston 9 and the operating tube 7, the piston 9 essentially does not move. And when the inclination angle reaches θ3=28°, the operating tube 7 is raised up by 100 mm, and the liquid level of the right side reaches to liquid level La-2, and that of the left side to liquid level Lb-2. That is, in this embodiment, the effect of friction and so on of the piston 9 is estimated as energy corresponding to a 100 mm rise of the piston 9.

As described the above, the liquid level change to La-2, Lb-2. Accompanying the change, the center of gravity shifts from the center of gravity G1 shown in FIG. 5 to G2 which is nearer to the center of rotation O than G1.

Next, when the inclination angle of the operating tube reaches inclination angle θ4=32 30', the liquid level of the liquid of the right side reaches La-3, which is higher than La-2 by 100 mm, and the liquid level of the left side changes from Lb-2 to Lb-3. The center of gravity shifts to G3 which is nearer to the center of rotation O than is G2.

When the inclination angle reaches θ5=37°, the liquid level of the liquid of the right side rises to La-4, which is higher than La-3 by 100 mm, to pushedly raise the piston 9 to the initial position shown in FIG. 5. Then, the liquid level of the left side changes from Lb-3 to Lb-4, and the center of gravity shifts from G3 to G4; that is, it reaches a position which coincides with the rotational center O. In other words, in this embodiment the center of rotation O is coincided with this center of gravity G4.

Thereafter, the operating tube 7 inclines further; however, when the inclination angles change from θ5=37° to the maximum θ6=40°, the liquid levels La-4, Lb-4 and center of gravity G4 do not fluctuate. When the inclination angle reaches θ6=40°, or directly before then, the stopper 14 operates to lock the piston 9 so that it cannot descent lower from its present position.

From this state, the operating tube 7 changes its direction of shifting movement inversely, that is, from a falling-down rotation to a raising-up rotation. However, in the case of the operating tube 7 being in a raising-up rotation, just before the operating tube 7 directly reaches inclination angle θ10= 0°, the piston 9 is locked at the upper limit position to the operating tube 7.

With respect to the liquid levels of both the right and left sides of the liquid L on the inside of the operating tube 7, between the inclination angles of the operating tube 7 being θ6–40°, and θ7=16° 50', a head does not exceed 760 mm, so that the liquid level of the right side is dept at the position La-4 which, as shown in FIG. 5, coincides with the lower surface of the piston 9, and the liquid level of the left side is kept as described above, at the position Lb-4. Accordingly, the position of the center of gravity of the operating tube 7 and the liquid L does not change from the center of rotation O, that is, the center of gravity is G4, as shown in FIG. 5.

When the inclination angle changes from θ7=16° 50' to θ8=11° 15', the liquid level of the right side lowers 100 mm from level La-4 to level La-3 to product Torricelli's vacuum 29 between the level and the lower surface of the piston 9.

By referring to FIG. 5, the above-described is explained as follows. When the inclination angle is θ7=16° 50', liquid level Lb-4 of the left side is on the same plane with an imaginary liquid level LA-7 (refer to line Y7), and a head between the imaginary liquid level LA-7 and the actual liquid level La04 is just 760 mm (at this time, the inclination angel of the operating tube 7 is minute, so that any effect caused by the inclination is negligible). When the operating tube 7 changes the inclination angle from this state to θ8=11° 15', the horizontal line shown in FIG. 5 changes from line Y7 to line Y8, and an imaginary liquid level at that time lowers 100 mm from level La-7 to the imaginary liquid level La-8. Accompanying with the change, the actual liquid level changes to La-3 which is higher by 760 mm than the imaginary liquid level La-8. In accordance with the movement, the liquid level of the left side raises 100 mm from Lb-4 to Lb-3. Then, the position of the center of gravity also changes from G4 to G3.

The operating tube 7 rises up to a state in which the inclination angle is θ9–5°45'; and with the same principle as described above, the actual liquid level of the right side changes to La-2, and the center of gravity G3 changes to G2.

When the inclination angle becomes to θ10=0°, with the same principle, the actual liquid levels of both the right and left sides return to the levels of La-1 and Lb-1, respectively. The center of gravity also returns from G2 to G1. As described above, the operating tube 7 returns to the initial state, and, the stopper 14 is subsequently released from its locking state by the releasing means 24. Thus, the above-described operation is repeated.

In FIG. 6 changes of the liquid level of the liquid L and changes in position of the lower surface of the piston 9 at this time are shown as (a) and (b) at the right side of FIG. 6.

At the upper part of FIG. 6, there are shown the rotational period of the rising-up and falling-down crankshaft 32 connected to the operating tube 7 by the connecting rod 36 and balancing relations of the centers of gravity at each point in the rotation of the crankshaft 32, diagrammatically by circles c, d and e, respectively. Arrow f indicates rotational direction. The innermost circle, a center of which is the crankshaft 32, shows a locus of rotation of the crank portion 32a, and lines θ1–θ10 extending radially from the center of the crankshaft 32 show periods of the crankshaft 32 corresponding to the inclination angles of θ1–θ10, respectively. In FIG. 6, for each position of the balance weight 41 corresponding to the respective inclination angles of the operating tube 7 θ1–θ10, the same reference number of θ1–θ10 are bestowed.

The next inner circle c represents with thick (wide) lines magnitudes of unbalance of gravity which are caused by a change of position of the center of gravity Gx of the operating tube 7 and the liquid L from G1–G4 accompanying by the rising-up and falling-down movements of the operating tube 7, and which are given to the crankshaft 32. Directions of the magnitudes are shown with arrows. As can be clearly understood from circle c, between θ5 and θ7 the center of gravity G4 coincides with the center of rotation O, so that unbalance of gravity is zero, and between θ7 and θ10 the center of gravity changes gradually from G4→G3→G2→G1; thus, it gradually separates from the center of rotation O, so that unbalance of gravity increases gradually. At the position of θ 10, it becomes the largest and keeps its state to the position of θ2. Between θ2 and θ5 the center of gravity changes gradually, in a reverse order as the above from G1→G2→G3→G4 and approaches the center of rotation, so that the unbalance of gravity is gradually reduced to zero.

Accordingly, by providing means for cancelling the unbalance of gravity shown by the circle c, it is possible to reduce unbalance of the gravity generated within one reciprocal movement of one single operating tube 7; that it, the unbalance of gravity generated per one rotation of the rising-up and falling-down crankshaft 32 is reduced to zero. Therefore, in principle, only by giving initial moving energy, the operating tube 7 can continue its reciprocal movement repeatedly (suggesting that friction or the like is to be zero).

Practically, with the descending movement of the piston 9 caused by Torricelli's vacuum, a large energy as described can be taken out or harvested which is given via the operating crankshaft 2 to the crankshaft 32 as rotational force. Accordingly, even if there are some unbalances of gravity, friction, etc., the above-described energy can sufficiently prevail. As means for cancelling unbalance of the gravity shown in circle c, for example, as described the above, there are means in which a pair of the symmetrical operating tubes 7 may be simultaneously operated symmetrically to like with a common rising-up and falling-down crankshaft 32. Means for connecting the balance weighing means is provided which serves to cancel the above-mentioned unbalance of gravity with the crankshaft 32 or the operating tube 7 so that they may be rotated simultaneously with each other. By means of multiplied effects of potential energies caused by the change of position of the center of gravity according to the shift of the liquid L and by the change of the center of gravity of the balance weighing means, the gravity of the liquid L, the balance weighing means, the operating tube 7 and the liquid L in the operating tube, the unbalance of gravity can be always balanced with a pivotal point of the operating tube 7.

In the present embodiment there is provided, as an example thereof, one balance weighing means 37 having a construction as described above. The balance weight 41 of this balance weight device 37 pivots in synchronization with the operating tube 7 via the sector gear 42. With the weight of the balance weight 41 and the inclination angle of the supporting rod 39, the balance weight 41 moves in synchronization with the rotation period of the crankshaft 32 and generates an unbalance shown in circle d in FIG. 6.

The thickness (width) of the line (locus) represents the magnitude of the unbalance, and the arrow indicates the direction of the acting force, which is the same as those of circle d. That is, in the case of the inclination angle being θ10, the balance weight 41 is positioned at the left most end of FIG. 6, so that the unbalance of gravity generated by center of gravity Gw and acting on the crankshaft 32 becomes the largest.

Within the range from the inclination angle of θ10 to slightly over from that of θ2, the balance weight 41 pivots downwardly; that is, by making a swinging movement, the gravity unbalance caused by center of gravity is then Gw gradually reduced to zero. then the gravity unbalance caused by center of gravity Gw acts in the opposite direction to that of circle c; that is, it acts on the crankshaft 32 as if it cancels the gravity unbalance caused by center of gravity Gw.

Next, the balance weight 41 pivots upwardly and to the right in FIG. 6, until it reaches the position of θ 6 which is the right most side. Gravity unbalance caused by center of gravity Gw gradually increases, and when it reaches the position of the θ6, the gravity unbalance becomes the largest. During these operations, gravity unbalance by center of gravity Gw acts in the same direction as the gravity unbalance which acts on circle c caused by center of gravity Gx.

Within the range from θ6 to a position between θ7 and θ8, the balance weight 41 pivots downwardly and to the left in FIG. 6, and gravity unbalance caused by center of gravity Gw during this time is reduced to zero. Within the range from the position between θ7 and θ8 to that of θ10, the balance weight 41 pivots upwardly and to the left in FIG. 6, and then gravity unbalance caused by center of gravity Gw gradually increases to the largest at least. Then, gravity unbalance by center of gravity Gw acts on the crankshaft 32 in the opposite direction to that of gravity unbalance of circle c caused by center of gravity Gx; that is, it counteracts the crankshaft so that the gravity unbalance caused by center of gravity Gx may be cancelled.

Circle e shows resultant unbalance resulting from the gravity unbalance generated from a change of center of gravity Gx of circle c and the gravity unbalance by center of gravity Gw of circle d.

Within the range from θ8 to θ2 through θ9, gravity unbalance caused by center of gravity Gw acts in the opposite direction to that in which the gravity unbalance caused by center of gravity Gx acts, and they mutually cancel each other. While within the range from θ2 to θ8 via θ3, gravity unbalance by center of gravity Gw acts in the same direction as that of the gravity unbalance caused by center of gravity.

Accordingly, the resultant unbalance is shown by circle 3. As described above, the resultant force appearing on circle e acts to balance weights on both the right and left sides generated by potential energies acting on each opposing direction about θ as the borderline between them.

As can be clearly understood from circle e, in the present embodiment it is impossible to cancel completely the gravity unbalance generated by center of gravity Gx by means of the balance weighing means 37. However, the resultant unbalance acts on the crankshaft 32 within the range from θ10 to θ6 through θ1 or the like (nearly the left half circular part in FIG. 6 in a direction at which the rotation of the crankshaft 32 may be interrupted; and while within the range from θ6 to θ10 through θ7 or the like (nearly the right half circular part in FIG. 6, the resultant unbalance acts on the crankshaft 32 in a direction that the rotation of the crankshaft 32 can be promoted. In comparison, it is understood that the latter (rotation promoting force) is larger than the other; accordingly, for each rotation of the crankshaft, the resultant unbalance may act to promote the rotation of the crankshaft 32 but does not interrupt the rotation at all.

In FIG. 7 there are diagrammatically shown a position of center of gravity Gx when the operating tube 7 is inclined from θ2 to θ10 (as the state at θ1 is nearly the same as that at θ2, it is omitted), a position of the balance width 41, for signs (such as ~, V, ▽, ▼) show magnitude of unbalance in a stepwise manner in which ~ indicates a balanced state, V indicates a smaller state, and ▽ indicates a middle state, and ▼ indicates a larger state.

Figure 2:
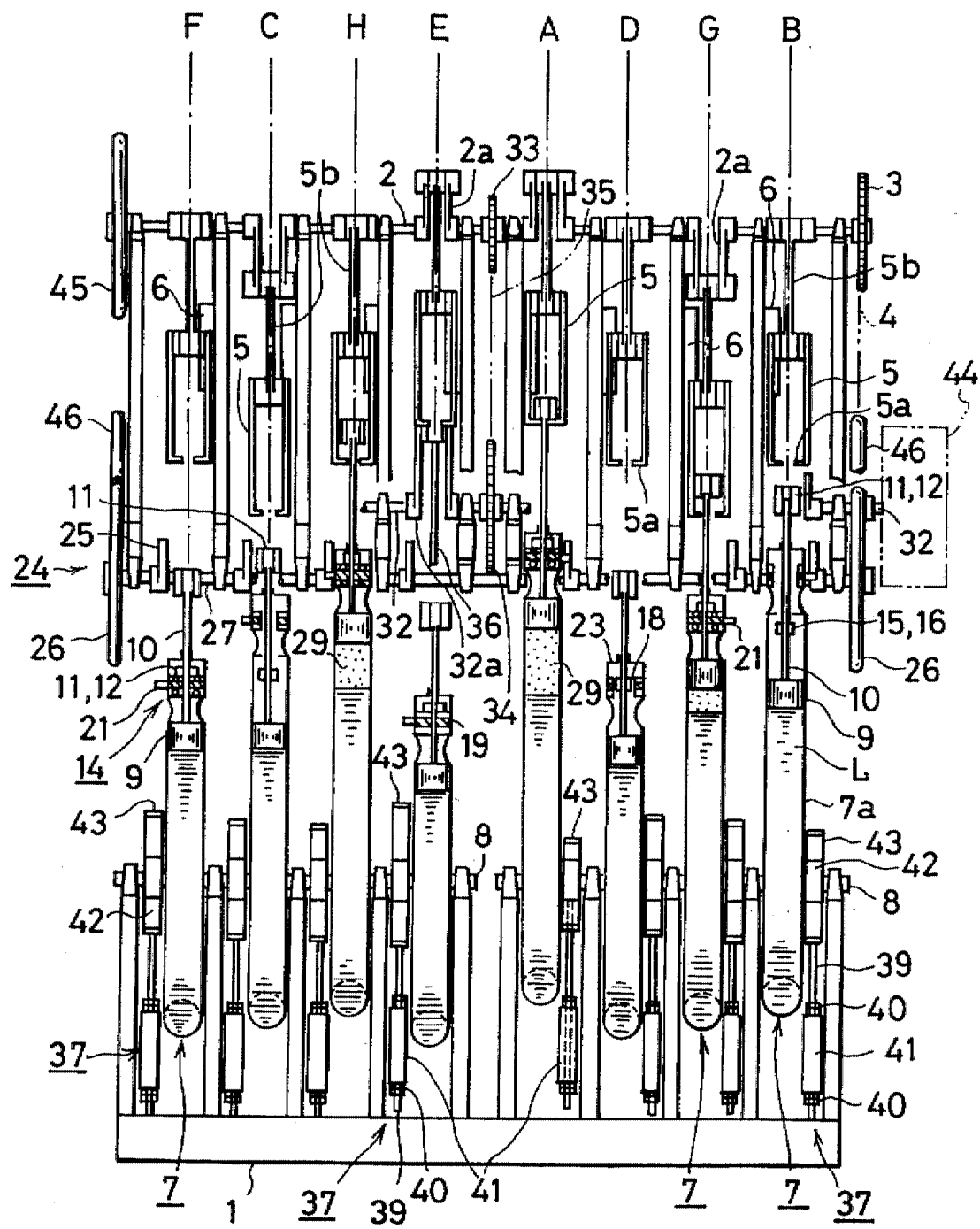
FIG. 2 is a side view of the first embodiment of the present invention.
Figure 8:
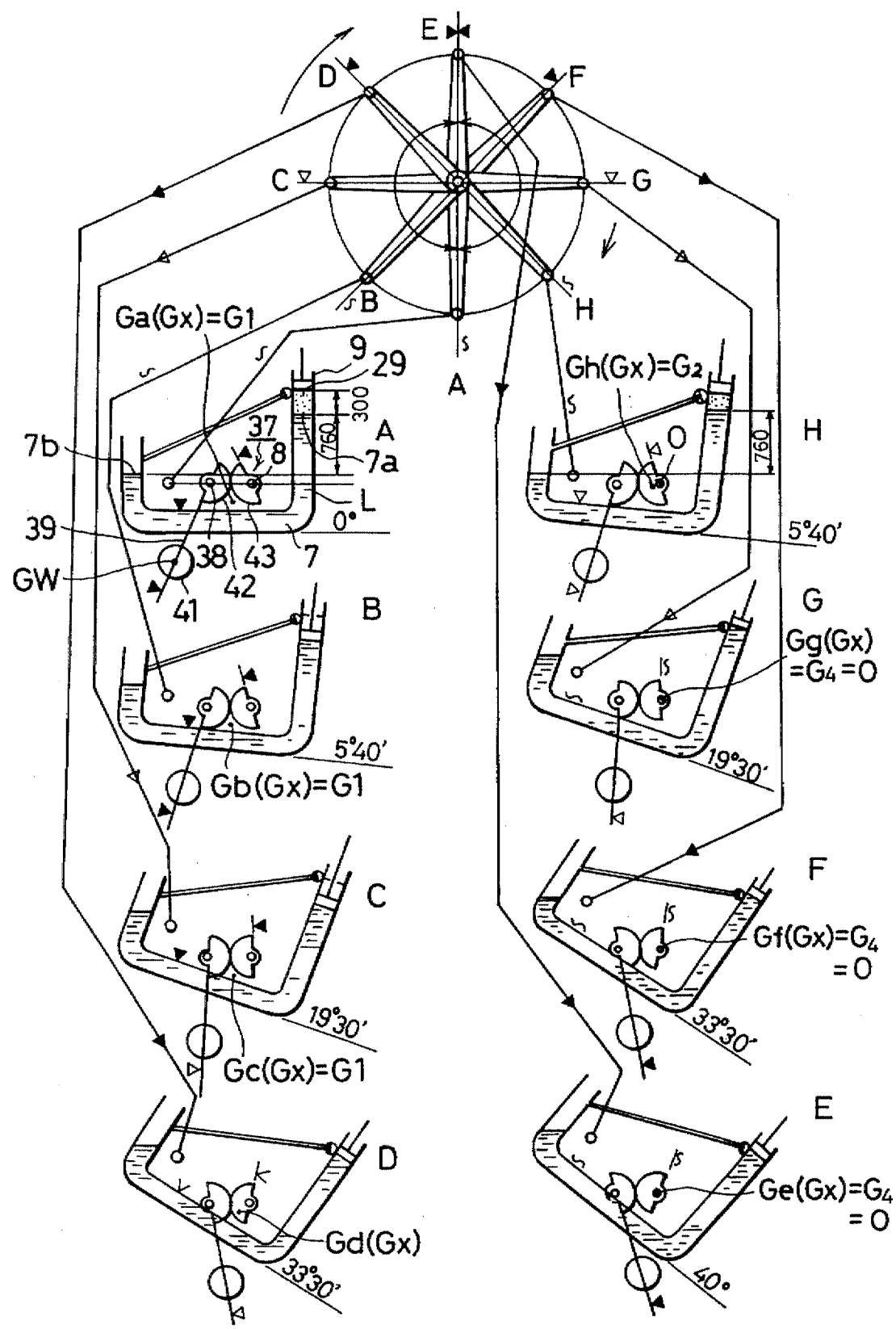
FIG. 8 is an operation illustrating view which diagrammatically shows states of each operating tube at a crank part being positioned at each A–H position.

FIG. 8 diagrammatically shows each of the states of the operating tube 7 at respective positions A to H shown in FIGS. 1 and 2 based on the operating principle of the operating tube 7 shown in FIG. 7, with each position of center of gravity Gx (each position of the centers of gravity at the respective positions A to H is shown as Ga–Gh) and each position of the balance weight 41 at respective states.

Based on the above-described operation principle, the entire operation of the present embodiment will be explained hereinafter referring chiefly to FIG. 8.

In order to pour the liquid L into each of the operating tubes 7, the operating tube 7 is located at a position indicated at D shown both in FIGS. 1 and 8. then, the electromagnetic valve 30 is opened, and at that state the liquid L is poured from the left end 7b of the operating tube into the inside of thereof. Thereafter, the electromagnetic valve is closed.

After having poured the liquid L into each of the operating tubes 7, and when the right end portion 7a of any one of the operating tubes 7 stands erectly and directly overhead, as shown by A in FIGS. 1, 2 and 8, it is set to be an initial state.

At this time the piston 9 is stopped at the upper limit position by the stopper 14, and the electromagnetic valve 30 is being closed; accordingly, under the piston 9 there is formed Torricelli's vacuum 29. then the difference in height between levels of the liquid L in the right end portion 7a and the left end portion 7b corresponds to about 760 mm Hg.

From the above-described state, the operating piece 25 is set at its operating position by rotating the handle 26 for the stopper; the operating piece 25 contacts with the projecting shaft 21; and the rotary plate 19 is pivoted to the releasing position.

Then, by means of a suctioning operation (in other words, by atmospheric pressure from the upperward movement of the piston 9) of the vacuum portion 29 in the operating tube 7, the piston 9 is lowered down, and, accompanying the lowering movement, the piston rod 10 and the pressing down roller 11 lower down. With the pressing down roller 11, the suspending member 5 is lowered down to rotate the operating crankshaft 2 in the clockwise direction as shown in FIG. 1.

Accompanying the rotation of the operating crankshaft 2, the crankshaft 32 is also rotated in the same direction, and, also accompanying this movement, the operating tube 7 is inclined gradually toward the right side. Energy given to the crankshaft 32 as rotational force is formularized by cross-sectional area (Din) of the piston 9×1 atmospheric pressure P×descending stroke S of the piton 9; i.e., it is expressed as Dm×P×S.

The apparatus is constructed such that at this time all the balance weights 41, all the operating tubes 7 and the liquid on the inside of the tubes are adapted nearly always to balance in gravity at the right side and the left side of the pivotal shaft 8, so that, in principle, scarcely any driving force for inclining the operating tubes 7 is necessary. Practically, initial energy for starting all the operating tubes 7, etc., to incline from their stationary states and energy for overcoming friction generated at each part of the operating tubes 7, etc., gravity unbalances and other resistant forces are needed; however, these energies can be, as shown by phantom lines in FIG. 2, supplied by an auxiliary power means 44 including a motor, reduction gear means, etc., which is connected to the rising-up and falling-down crankshaft 32 or the operating crankshaft 2.

At a normal operating state, after starting in motion, even if operation of the auxiliary power means 44 is stopped, for each rotation of the crankshaft 32, energy expressed by a formula (that is, the cross-sectional area Dm of the piston 9×1 atmospheric pressure P×descending stroke S of the piston 9×8 (times)) is applied onto the operating crankshaft 2 and the crankshaft 32 as rotational forces. These rotational forces can sufficiently overcome the friction generated at each of the parts and other resistances, so that the operation of the whole apparatus does not stop. Energy which is obtained by subtracting those frictions and other resistances from these rotational forces is taken out from an output shaft, i.e., the operating crankshaft 2.

The operating tube 7 begins to incline to the right side, and when it reaches position B in FIGS. 1 and 8, an other operating tube 7 reaches position A, and the same operation begins: onto the crankshaft 32, energy expressed as the cross sectional area Dm×1 atmospheric pressure P×the descending stroke S of the piston 9 is applied as rotational force. similarly as in the previously mentioned cases, the operating tube 7 reaches each position C, D and E shown in FIGS. 1 and 8, and the other operating tube 7 reaches at position A, so that energy similar to that described above is applied onto the crankshaft 32 as rotational force.

During the inclination movement of the operating tube 7, the pressing down roller 11, which has lowered the suspending member 5, separates from the suspending member 5 to the right side and rollingly moves along the guide piece 28.

As an inclination of the operating tube 7 toward the right increases, the liquid level of the liquid L of both the right end portion 7a and the left end portion 7b become nearly the same 9refer to C in FIGS. 1 and 8. When the level of the liquid of the left end portion 7b becomes higher than that of the right end portion 7a, with the head the piston 9 being pushedly raised up on the inside of the right end portion 7a of the operating tube 7, the pin 15 passes through the penetrating hole 18 of the rotary plate 19 and comes to be situated at a position higher than it. Thereafter, the projecting shaft 21 contacts the operating piece 22 to pivot to the locking position, after which the descending motions of the piston 9 and the pressing down roller 11 are stopped (refer to E in FIGS. 1 and 8).

Then, by operating each of the operating tubes 7 in a manner the same as that previously described, one after another with delayed timing (the phase), the operating crankshaft 2 is continuously rotated, and, in synchronization with it, the crankshaft 32 is rotated. With the rotation of the crankshaft, the operating tube 7 reaches position E shown in FIGS. 1 and 8 and returns back to the original position A after passing through each of the states shown in respective positions F, G and H shown in FIGS. 1 and 8.

When the operating tube 7 returns to the original position A, the projecting shaft 21 contacts the operating piece 25 which remains at its operating position, and is pivoted to the releasing position of the rotary plate 19; thereafter, an operation similar to that as described above is repeated.

All the operating tubes 7, the liquid L on the insides of the operating tubes 7, and all the balance weights 41 are nearly always balanced about the pivotal fulcrum of the operating tubes, so that, as described the above, scarcely any energy is necessary for carrying out the reciprocal movement of each of the operating tubes 7, and almost the entire descending force of the piston 9 by Torricelli's vacuum 29 is utilized as rotational force of the operating crankshaft 2. Thus, the operating crankshaft 2 is effectively and continuously rotated to give necessary driving force to any driven device.

In the case of omitting the diaphragm 13 in which there is the possibility of air remaining under the piston 9 in the right end portion 7a of the operating tube 7, the present apparatus is so adapted that, per predetermined rotations of the operating crankshaft 2 and when the operating tube 7 inclines to position D shown in FIGS. 1 and 8, the remaining air is exhausted to the atmosphere via the bypass tube 31 by opening or closing the electromagnetic valve 30 and can be easily restored to the normal state. Further, when the operating tube 7 inclines to position D, it may be also possible to make the electromagnetic valve 30 perform the opening and closing operation automatically to exhaust air remaining under the piston 9 per pivotal reciprocal movement of the operating tube 7.

It is also possible to operate the auxiliary power means 44 continuously so that the operating shaft 2 may output power larger than that which is brought out from the auxiliary power means 44. That is, it is a so-called twice power means.

The auxiliary power means 44 may be connected with the operating crankshaft 2. Further, it is also possible to make the raising-up and falling-down crankshaft 32 as an output shaft from which power is to be output.

Figure 9:
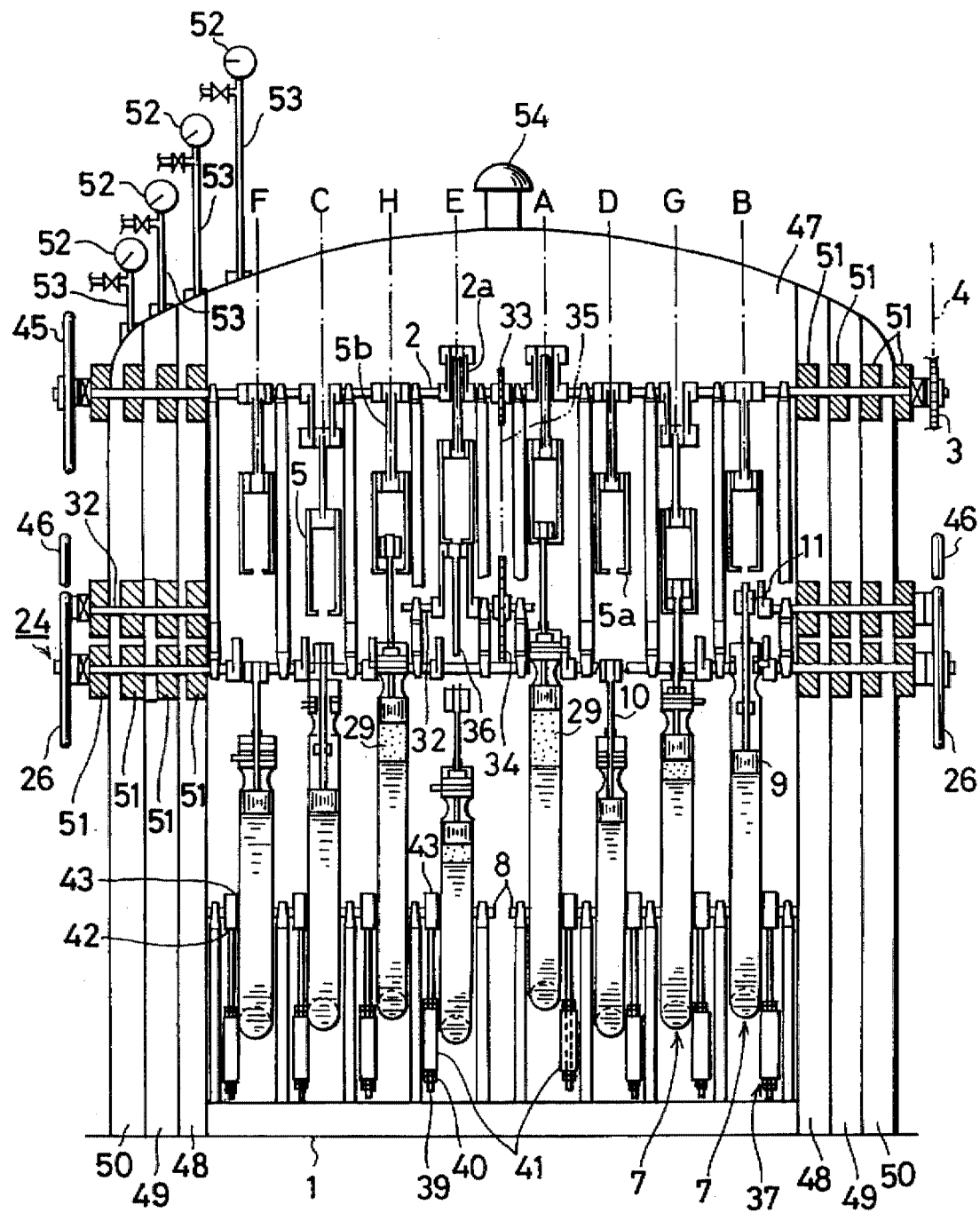
FIG. 9 is a longitudinally sectioned elevation view showing the second embodiment of the present invention.

In FIG. 9 there is shown the second embodiment of the present invention. In this second embodiment of the present invention, with the exception of the operating part of the fist embodiment such as the handle 26 of the stopper, the operating handle 45 connected with the operating crankshaft 2, the operating handle 46 connected with the raising-up and falling-down crankshaft 32, and the output part such as the chain sprocket 3 and the chain 4, the entire apparatus is accommodated in the pressure chamber 47. In the second embodiment, the same reference numbers are bestowed to those elements which are the same as those of the first embodiment, and detailed explanation therefor is abbreviated.

Reference number 48, 49 and 50 are auxiliary pressure chambers mounted at the both sides of the pressure chamber 47 which serve to reduce leakage of pressure from the penetrating part of the pressure chamber 47 of the operating crankshaft 2 and the crankshaft 32. The pressure chamber 47 and the auxiliary pressure chambers 48, 49 and 50 are provided with shaft sealing members 51 at each penetrating portion of the operating crankshaft 2 and the crankshaft 32. Further, each is connected with a compressed air feeding pipe 53 having a pressure gauge 52 at the upper portion thereof.

It is desirable to maintain a gradual reduction in the pressures of the pressure chamber 47 and the auxiliary pressure chamber 48, 49 and 50, for example, 5 atmospheric pressure, 4 atmospheric pressure, 3 atmospheric pressure and 2 atmospheric pressure, etc. The number of the auxiliary pressure chambers may be increased or reduced according to necessity, and, of course, omission can be made. Reference number 54 indicates a safety valve.

With such a construction as the present embodiment, energy obtained by one descending motion of the piston 9 becomes equal to: cross-sectional area Dm×descending stroke S of the piston×pressure P on the inside of the pressure chamber 47. Accordingly, in the case of the pressure on the inside of the pressure chamber 47 being, as described the above, 5 atmospheric pressure, energy of five times than that obtained by the fist embodiment can be obtained.

Figure 10:
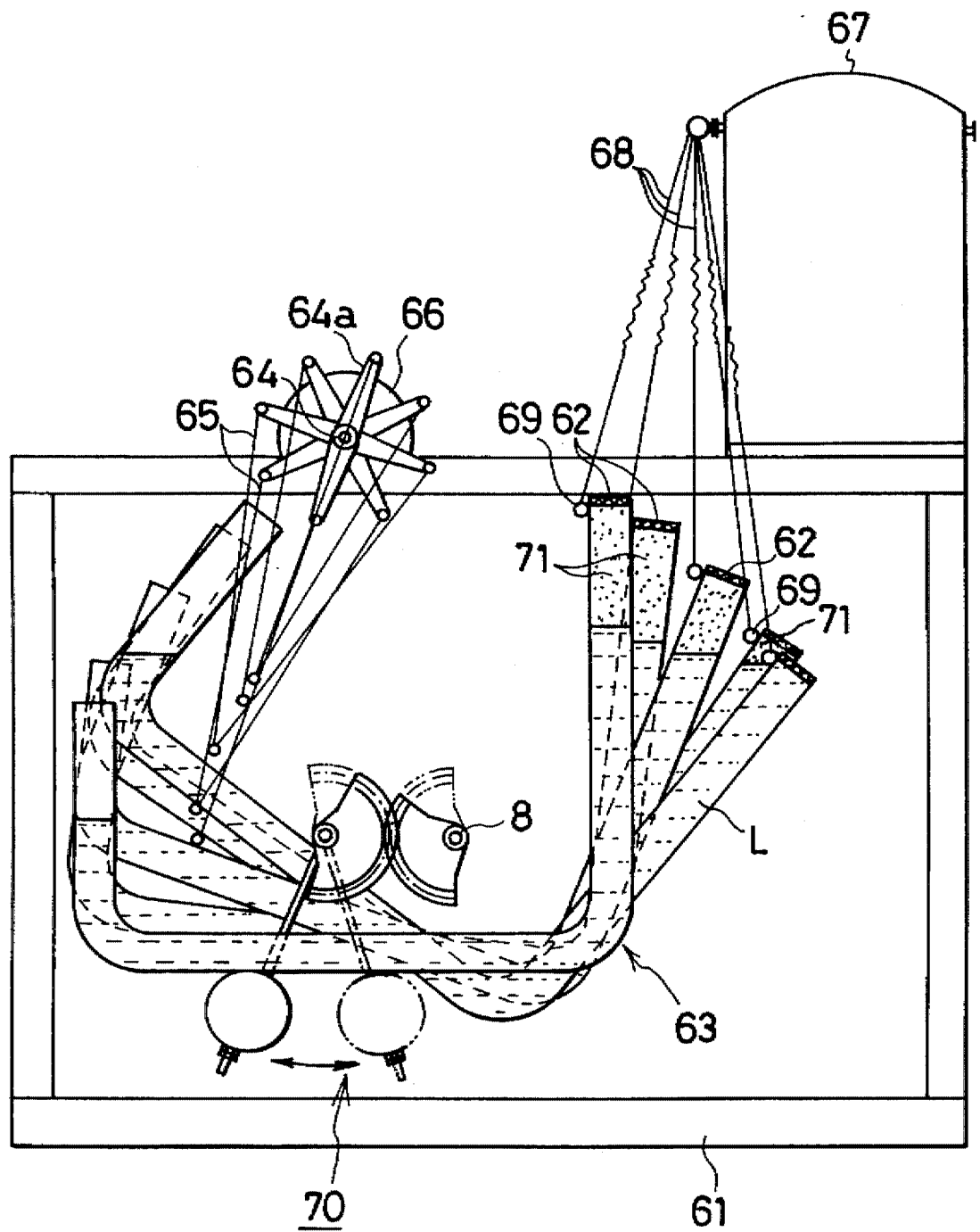
FIG. 10 is an elevational view of one embodiment of vacuum generating apparatus according to the present invention.

FIG. 10 shows an embodiment of a vacuum generating apparatus of the present invention. The vacuum generating apparatus of this embodiment produces Torricelli's vacuum by applying the identical principle as that of the first embodiment of the power generating apparatus according to the present invention, and it utilizes Torricelli's vacuum as a vacuum source. The vacuum generating apparatus includes a frame 1, operating tube 7, raising-up and falling-down crankshafts 32, balance weight means 37, etc., which are identical or similar to those described in the first embodiment of the present invention.

That is, the vacuum generating apparatus according to this embodiment includes a frame 61 the same as that of the first embodiment and a plurality of operating tubes 7 (the same as those of the first embodiment with 8 operating tubes being provided. Each of the operating tubes 7 is bent in a U shape with one end portion thereof being closed with a lid 62, the other end portion thereof being opened, and the inside thereof being filled with liquid L. Each of the operating tubes 7 are pivotally supported by a horizontal pivot 8 at a nearly intermediate portion thereof to the frame 61 so that the close end portion of each of the operating tubes 7 may be pivotally moved in the range from a position at which the closed end is directed nearly overhead to a position where the closed end portion inclines in an obliquely upward direction. Raising-up and falling-down crankshafts 64 are provided, each of which has a plurality (the same as those of the first embodiment with 8 being provided) of crank portions 64a each of which separates sequentially with each other by the same angular pitch. Connecting rods 65 are provided, each of which connects an eccentric portion of each of the operating tubes 63 with each of the crank portions 64a of the respective raising-up an falling-down crankshafts 64 so that all the operating tubes 63 and the liquid L on the inside thereof may always balance in gravity by setting the pivotal point of the operating tube 63 as a fulcrum. A driving means 66 is provided for rotating the crankshafts 64. A plurality of flexible tubes 68 are provided, each of which connects each of the closed portions of the respective operating tubes 63 to the pressure reduction tank 67. And a plurality of electromagnetic valves 69 are provided, each of which is mounted on the end portion of each of the flexible tubes 68 which is near respective operating tubes 63 and capable of switching a first valve opening position at which a closing position of the operating tube 63 communicates with the flexible tube 68 to a second valve opening position where the operating tube 63 communicates with the atmosphere.

The length of the closed end portion of each of the operating tubes 63 is defined as a length such as, when the closed end portion is directed nearly overhead, to produce Torricelli's vacuum under the lid 62 by means of the liquid L on the inside of the respective operating tubes 63. The driving means 66 may include similar components as the auxiliary power means 44 in the first embodiment, such as a motor and reduction gear means connected with the crankshaft 64. Balance weighing means 70 has a similar construction as that of the first embodiment.

In the present embodiment, all the operating tubes 63, the liquid L on the inside of the tubes, and the raising-up and falling-down crankshafts 64 (and, if necessary, all the balance weighing means 70) are adjusted so that they can be always balanced in gravity with the pivotal axis (pivot) 8 of the operating tubes 63 as a fulcrum. Then, the crankshafts 64 are sequentially and continuously rotated by the driving means 66, with each of the operating tubes 63 sequentially raising up and falling down in different phases, and when erected, Torricelli's vacuum 71 is produced under the lid 62.

Accordingly, if the electromagnetic valve 69 is adapted to automatically control itself so that it may be situated at the first valve opening position when the operating tube 63 erects, then thereafter when the operating tube 63 falls down, it may be located at the second valve opening position. further, while the operating tube 63 is from the state of falling down to that of directly before its erecting up, it may be in the valve closing position. When the operating tube 63 erects, it communicates with the flexible tube 68, and the air in the pressure reducing tank 67 is suctioned by Torricelli's vacuum 71 on the inside of the operating tube 63, so that the pressure in the pressure reducing tank 67 is further reduced. Next, while the operating tube 63 is falling down, the air on the inside of the operating tube 63 is exhausted. further, from the state that the operating tube 63 is falling down to the state just prior to erecting up, the upper portion of the operating tube 63 is hermetically sealed, and again Torricelli's vacuum 71 is produced. As described above, by sequentially repeating this operating cycle, the pressure in the pressure reducing tank 67 is gradually reduced. Thus, with a smaller input, a highly efficient vacuum pump can be obtained.

As can be clearly understood from the above, according to the present invention the following effects and functions can be obtained.

1. Since power can be obtained by applying clean atmospheric pressure, no problem of environmental pollution can be occurred, and scarcely no power is needed, so that it is highly economical and can be installed anywhere.

2. Depending upon a particular embodiment of the inventions, highly practicable apparatus can be realized.

3. According to the invention, either the operating crankshaft or the raising-up and falling-down crankshaft is liked with the auxiliary power means and uses this auxiliary power means as a starter. this can supplement all or a portion of the energy necessary for the present apparatus to attain the ordinary operation state from its stationary state, and to reach the normal operating state for a short time. Further, if this auxiliary power means is continuously operated even at the normal operating state, by providing less energy from the auxiliary power means, larger energy can be obtained from the operating crankshaft or the raising-up and falling-down crankshaft. That is, so-called power multiplied apparatus can be achieved.

4. In the case of applying the balance weighing means, gravity unbalance generated in the inclining movement of each of the operating tubes can be considerably smaller, so that balancing the effect of gravity with respect to the raising-up and falling-down crankshaft becomes easier.

5. If an air exhausting pipe having an electromagnetic valve is provided at a portion to which the level (surface of the liquid) of the liquid on the inside of the operating tube reaches in the upwardly directed end thereof, when the operating tube is inclined to a maximum, even if air enters under the piston on the inside of the operating tube, the air can be easily removed. It is also convenient to pour liquid on the inside of the operating tube.

6. If a flexible diaphragm which can expand and contract in response to the sliding movement of the piston is provided between the piston and the operating tube in which the piston is slidably fit, intrusion of air between the piston and the operating tube can be surely prevented.

7. In the case of the entire apparatus except the operating part and the output part being accommodated in the pressure chamber, energy obtained by one descending movement of the piston can be increased in proportion to intensity of the pressure in the pressure chamber. Thus, energy efficiency can be improved.

8. In the vacuum generating apparatus embodiment of the invention, all the operating tubes and the liquid on the insides thereof are always nearly at a well-balanced state in gravity, so that by providing only a small rotating force to the raising-up and falling down-crankshaft by driving means, the crankshaft rotates continuously and all the operating tubes are inclined by changing respective phases consecutively. And by Torricelli's vacuum formed in one of the operating tubes which is being erected at the moment, pressure in the inside of a pressure reducing tank 67 is gradually reduced which results in a high efficient vacuum pump.

9. If a balance weighing device is applied to the vacuum generating apparatus, unbalance in gravity generated in the case of the inclination of the respective operating tubes can be considerably smaller and can facilitate to balance in gravity with respect to the raising-up and falling-down crankshaft.

I claim:

1. A power generating apparatus applying Torricelli's vacuum comprising:

a frame;

a plurality of operating tubes each of which is pivotally supported by a pivotal shaft provided at an intermediate portion of said frame so that each of said operating tubes can freely make rising-up and falling-down movements;

a crankshaft having a plurality of crank parts;

each of said plurality of operating tubes being provided with a piston at an upper end thereof, said piston being slidably and hermetically fit into each of said operating tubes, each of said operating tubes having an inside for accommodating a liquid, under each said piston on the inside of said operating tube Torricelli's vacuum is formed when said operating tube is in a position directed substantially overhead;

each said piston being connected with a respective one of said crank parts of said crankshaft by driven means;

accompanying rotation of said crankshaft, said operating tubes being driven to said rising-up and falling-down movements in mutually different phases;

each of said operating tubes and said liquid therein being mutually related so as to be able to balance in gravity about both sides of said pivotal shaft of said operating tubes by making said pivotal shaft as a border thereof.

2. A power generating apparatus applying Torricelli's vacuum comprising:

a plurality of operating tubes each of which is folded upwardly at both ends thereof nearly with a right angle to an intermediate portion and has an inside thereof filled With a liquid, each of said operating tubes being pivotally movable about a pivotal axis on the intermediate portion thereof so as to be able to pivot within a range that from a position at which both said ends are inclined slightly upwardly to a position at which both said ends are directed nearly overhead;

a plurality of pistons each of which is slidably fit on the inside of an upper end of said ends of a respective said operating tube in a longitudinal direction thereof so as to maintain a hermetical fit therein;

a plurality of piston rods each of which is connected at one end thereof with each of said pistons and at the other end thereof with a pressing down roller, each of said piston rods penetrating upwardly said upper end of each said operating tube and extending along said upper end in parallel, each said pressing down roller being pivotally secured;

an operating crankshaft disposed rotatably on an upper portion of said frame, said crankshaft having a plurality of crank parts which are disposed to have a same angle difference with each other;

a plurality of suspending members each of which is suspended from each of said crank parts of said crankshaft, said plurality of suspending members for rotating said crank shaft, a lower end portion of each said suspending member being provided with a horizontal piece with which said pressing roller of said piston engages, said horizontal piece being pressedly lowered by said pressing roller to urge said operating crankshaft to rotate;

a rising-up and falling-down crank shaft linked with said operating crankshaft so as to rotate simultaneously therewith, said rising-up and falling-down crankshaft having a plurality of crank parts each of which is remote at a same angle difference from each other;

a plurality of connecting rods each of which connects an eccentric portion of each of said operating tubes with each of said crank parts of said rising-up and failing-down crankshaft so that, accompanying rotation of said rising-up and failing-down crankshaft, ail of said operating tubes begin rising-up and failing-down movements in different phases, and all of said operating tubes and said liquids filled therein are always balanced in gravity at said pivotal axis;

stopper means for preventing each of said piston rods from being lowered when said upper end of each of said operating tubes is inclined to disengage said pressing down roller from said horizontal piece of said suspending member and when said piston is pushed up by a raising of said liquid on the inside of said lapper end of said inclined operating tube; and a plurality of releasing means each of which is provided for releasing a stopped condition of each of said operating tubes when said upper end of each of said inclined operating tubes is directed approximately overhead;

wherein a length of each of said upper ends of each of said operating tubes is determined to such a length as to form Torricelli's vacuum under said piston by said liquid of each said operating tube when said upper end comes to a position at which said upper end is directed nearly overhead.

3. A power generating apparatus applying Torricelli's vacuum according to claim 2, wherein either of said operating crank or said rising-up and failing-down crankshaft is adapted to an output shaft connected with driven means.

4. A power generating apparatus applying Torricelli's vacuum according to claim 3, wherein either of said operating crank or said rising-up and failing-down crankshaft is coupled with auxiliary power means.

5. A power generating apparatus applying Torricelli's vacuum according to claim 4, further comprising:

a plurality of balance weights each of which is mounted in the vicinity of said pivotal axis of said operating tubes so that a center of gravity of each balance weight always acts with respect to said pivotal axis in a direction opposite to a direction in which a center of gravity of each of said operating tubes shifts in response to said rising-up and failing-down movement of each of said operating tubes; and a plurality of balance weighing means which balances a change in gravity caused by a shifting in position of a center of gravity according to a removal of said liquid and a change in position of said balance weights;

wherein ail said balance weights, all said operating tubes and all liquid therein are always kept in balance in gravity at said pivotal point.

6. A power generating apparatus applying Torricelli's vacuum according to claim 5, further comprising:

a plurality of bypass tubes each of which is provided with an electromagnetic valve at a portion of said upper end of each of said operating tubes to which a level of said liquid therein reaches when each of said operating tubes inclines in maximum.

7. A power generating apparatus applying Torricelli's vacuum according to claim 6, further comprising a flexible diaphragm between each of said pistons and each of said operating tubes into which said piston is slidably fit;

said flexible diaphragm capable of being expanded and contracted in response to a sliding movement of said piston and being adapted to seal hermetically between said piston and said operating tubes.

* * * * *

UNITED STATES PATENT AND TRADEMARK OFFICE
CERTIFICATE OF CORRECTION

PATENT NO. : 5,671,602
DATED : September 30, 1997
INVENTOR(S) : Kunio Hashimoto

It is certified that error appears in the above-indentified patent and that said Letters Patent is hereby corrected as shown below:

Column 19, line 28, change the word "With" to -- with --.

Column 19, line 66, delete the term "failing" and insert the term -- falling --.

Column 20, line 1, delete the term "failing" and insert the term -- falling --.

Column 20, line 1, delete the term "ail" and insert the term -- all --.

Column 20, line 2, delete the term "failing" and insert the term -- falling --.

Column 20, line 11, delete the term "lapper" and insert the term -- upper --.

Column 20, line 27, delete the term "failing" and insert the term -- falling --.

Column 20, line 31, delete the term "failing" and insert the term -- falling --.

Column 20, line 41, delete the term "failing" and insert the term -- falling --.

Column 20, line 47, delete the term "ail" and insert the term -- all --.

Signed and Sealed this

Ninth Day of December, 1997

Attest:

BRUCE LEHMAN

*Attesting Officer*     *Commissioner of Patents and Trademarks*